United States Patent [19]
Yodis et al.

[11] 3,976,751

[45] Aug. 24, 1976

[54] STABILIZATION OF LIQUID SULFUR TRIOXIDE

[75] Inventors: Anthony W. Yodis, Camillus; Frank J. Kremers, Jordan; Karol K. Lintern, Camillus, all of N.Y.

[73] Assignee: Allied Chemical Corporation, Morris Township, N.J.

[22] Filed: Oct. 21, 1974

[21] Appl. No.: 516,716

[52] U.S. Cl. ............................................. 423/271
[51] Int. Cl.² ................... C01B 17/68; C01B 17/70
[58] Field of Search ............................ 423/270, 271

[56] References Cited
UNITED STATES PATENTS

| 2,716,594 | 8/1955 | Harris, Jr. et al. | 423/271 |
| 2,833,625 | 5/1968 | Pick | 423/271 |
| 3,160,474 | 12/1964 | Schnoor | 423/271 |

FOREIGN PATENTS OR APPLICATIONS

| 758,005 | 5/1967 | Canada | 423/271 |
| 30,170 | 12/1968 | Japan | 423/270 |
| 946,033 | 1/1964 | United Kingdom | 423/271 |

*Primary Examiner*—Oscar R. Vertiz
*Assistant Examiner*—Gary P. Straub
*Attorney, Agent, or Firm*—Gerhard H. Fuchs; Anthony J. Stewart

[57] ABSTRACT

Liquid sulfur trioxide is stabilized against polymerization by incorporating therein a stabilizer combination of a normally liquid siloxane polymer with a methyl ester of an acid of boron.

12 Claims, No Drawings

STABILIZATION OF LIQUID SULFUR TRIOXIDE

BACKGROUND OF THE INVENTION

This invention relates to the stabilization of liquid sulfur trioxide and particularly to the stabilization of liquid sulfur trioxide containing small quantities of $H_2SO_4$.

At room temperature, liquid sulfur trioxide polymerizes to various degrees. The three generally recognized $SO_3$ modifications melt at approximately 17°C., 32.5 C. and 62°C., respectively. On standing at temperature below about 27°C., in the presence of even small amounts of moisture, the form melting at about 17°C. rapidly polymerizes to the higher melting forms. The mass soon becomes solid and must be melted at temperatures up to 100°C., usually under dangerously high pressures., In many industrial processes, it is highly desirable to use $SO_3$ in its strongest form. However, the foregoing characteristics of liquid sulfur trioxide create marked disadvantages relative to the storage, shipment and use of such material. While, for example, liquid sulfur trioxide might be shipped in drums equipped with heating coils, there is involved the problem of supplying a relatively expensive form of container. Moreover, since heat transfer through a solid material is poor, the solidified sulfur trioxide in the container can be melted by the user only with considerable difficulty. In addition to this disadvantage, after relatively long periods of standing, a large proportion of the liquid sulfur trioxide will have polymerized to the high melting forms in which case complete melting can only be effected by heating at high temperatures under considerable pressure.

Various materials have been added to liquid sulfur trioxide to prevent the formation of solid polymers. Although boron trioxide has been successfully used commercially as a stabilizer, it leaves a solid residue after vaporization of the stabilized liquid product. Moreover, the product requires subsequent pressure treatment for effective stabilization. Use of trimethoxy boroxine or methyl borate gives a product leaving a non-flowable gummy or viscous residue after vaporization. Such residues adhere to the walls of the vaporizer, necessitating periodic cleaning of the vaporizer, e.g., by water washing, and subsequent careful drying to avoid undesirable introduction of water into the liquid sulfur trioxide. Use of polymeric methyl or methoxy substituted siloxanes is also effective and yields a liquid residue on evaporation. Unfortunately, however, such siloxanes also have relatively low tolerance for $H_2SO_4$, and relatively large amounts of such siloxanes are required, in the order of about 0.5 percent by weight, to stabilize sulfur trioxide containing $H_2SO_4$ in amount of about 0.1 percent by weight. This is undesirable from a commercial point of view since these siloxanes are rather expensive. Use of dimethyl sulfate, although giving a product leaving a flowable liquid residue after vaporization, fails to stabilize liquid sulfur trioxide containing as little as about 0.01% $H_2SO_4$ (equivalent to about 0.002% $H_2O$) and often fails to stabilize completely anhydrous liquid sulfur trioxide. Use of a combination of boron compound and dimethyl sulfate is quite effective in stabilizing liquid sulfur trioxide. However, dimethyl sulfate is highly toxic and a suspected carcinogen so that its use is desirably avoided.

Hence, there is a distinct need in the art to develop stabilizers for liquid sulfur trioxide which give a product which leaves a flowable liquid residue after vaporization, does not require subsequent pressure treatment for effective stabilization, has good moisture tolerance, has relatively low toxicity and is of relatively low cost.

An object of this invention is to provide stabilized forms of liquid sulfur trioxide which do not polymerize to any substantial degree and remain liquid at room temperature.

Another object of the invention is to provide stabilizing agents which have a high tolerance for moisture, i.e., which are effective for stabilizing liquid sulfur trioxide containing small quantities of sulfuric acid.

Still another object of the invention is to provide stabilizing agents which result in a product not requiring subsequent pressure treatment to effect stabilization.

A further object of the invention is to provide stabilizing agents which leave a flowable liquid residue after vaporization of the stabilized liquid sulfur trioxide and which have relatively low toxicity.

SUMMARY OF THE INVENTION

According to our invention, liquid sulfur trioxide can be stabilized by incorporating therein a stabilizer combination comprising (1) a normally liquid siloxane polymer substituted by a radical selected from the group consisting of methyl and methoxy in which all silicon valences unfilled by said radical are satisfied by hydrogen, in amount of at least about 0.01 percent by weight of the sulfur trioxide, and (2) a methyl ester of an acid of boron, in amount of at least about 0.01 percent by weight, the weight ratio of siloxane polymer to the methyl ester being from about 1:1 to about 10:1.

DETAILED DESCRIPTION OF THE INVENTION AND OF THE PREFERRED EMBODIMENTS

The liquid sulfur trioxide to be stabilized may be obtained from any source. For example, liquid $SO_3$ may be obtained commercially by distilling, say 30%, oleum under conditions to avoid vaporization of $H_2SO_4$ and condensing the $SO_3$ at temperature, say 20–30 C., at which liquid sulfur trioxide has sufficiently low vapor pressure. Similarly, liquid sulfur trioxide may be obtained from the dry, mist-free, say 10% $SO_3$ exiting a catalytic $SO_2$ oxidation operation by compressing the gas to about 160–170 pounds per square inch and cooling the compressed gas to 20°–25°C., under which conditions about 70% of the $SO_3$ may be liquefied and recovered as liquid sulfur trioxide. Liquid sulfur trioxide so produced generally contains about 0.01% to 0.1% $H_2SO_4$ but may contain as much as 0.2% $H_2SO_4$. Although our invention is particularly concerned with stabilization of such commercial forms of liquid sulfur trioxide, it may be applied to stabilization of completely anhydrous liquid sulfur trioxide or liquid sulfur trioxide containing up to about 1.0% $H_2SO_4$.

The siloxane polymers which are employed in the present invention are those described in U.S. Pat. No. 2,716,594 of Aug. 30, 1955. They comprise methylated or methoxylated polymeric forms of siloxane or disiloxane, characterized by the nucleus (Si-$O_n$Si) wherein n is 1 or more and the valence bonds of the silicon atoms not satisfied by methyl or methoxy groups are satisfied by hydrogen. Siloxane polymers suitable for use in the compositions of the present invention have viscosity of less than about 12,500 cps. at 25°C., preferably less than about 1000 cps. at 25°C.

Suitable siloxane polymers include those having the general formula:

wherein n is between 1 and about 900 and R', R'' and R'' are methyl or methoxy groups or hydrogen. These straight-chain siloxane polymers preferably contain from 1.0 to 1.6 methyl groups per silicon atom in the molecule.

A second group of siloxane polymers capable of being used is that embracing the cyclic compounds [R'R''SiO]$_n$ wherein n is between 3 and about 900. R' and R'' may be either hydrogen or a methyl or methoxy group.

Other siloxane polymers characterized by various cyclic, linear or combinations of cyclic and linear linkages and/or crosslinkages also fall within the scope of this invention.

The methyl polysiloxanes and, in particular, trimethyl end-blocked dimethyl siloxanes, either individually or in mixtures, are very effective.

Highly effective liquid trimethyl end-blocked dimethyl siloxane polymers include fluids having physical properties within the following ranges:

| Viscosity Centistokes at 25° C. | Approximate Molecular Weight | Specific Gravity 25° C./25 C. |
|---|---|---|
| 10 | 1,100 | 0.945 |
| 20 | 2,000 | 0.955 |
| 100 | 6,400 | 0.970 |
| 500 | 18,000 | 0.973 |
| 1,000 | 25,000 | 0.973 |
| 10,000 | 57,000 | 0.973 |

Methyl esters of acids of boron include methyl borate and trimethoxy boroxine, commercially available compounds, which are preferred for purposes of the present invention.

The quantities of siloxane polymer and methyl ester of an acid of boron employed depend largely upon the degree of stabilization desired and the amount of water present in the material. In general, the larger the amount of stabilizer added, the greater is the stabilizing effect thereof; and, considering anhydrous sulfur trioxide as a starting point, the greater the amount of water, the greater is the tendency for $SO_3$ polymers to form and the greater will be the amount of stabilizer required to effect a given degree of stabilization.

The amount of siloxane polymer employed is at least about 0.01 percent up to 1.0 or higher by weight of the sulfur trioxide, with the preferred amount being from 0.05 to 0.2 percent by weight of the sulfur trioxide. The amount of methyl ester of an acid of boron used is at least about 0.01 percent up to 0.5 or higher by weight of the sulfur trioxide, and is preferably from 0.02 to 0.1 percent by weight of the sulfur trioxide. Further, in order to realize the desired results of this invention, the weight ratio of the siloxane polymer to the methyl ester must be from about 1:1 to about 10:1. When preferred quantities of siloxane polymer and methyl ester are employed, ratios of siloxane polymer to methyl ester of about 1:1 to 3:1 are desirable.

The siloxane polymer and methyl ester of an acid of boron each generally contributes to stabilization of the liquid sulfur trioxide. The siloxane polymer, when used alone, does not effectively stabilize liquid sulfur trioxide containing normally small amounts of moisture. Addition of the methyl ester of an acid of boron to the siloxane polymer, however, imparts a moisture tolerance to the system. Moreover, it was surprising to find that combined use of the siloxane polymer together with the methyl ester resulted in an easily handled liquid residue, rather than in a gummy solid or semisolid residue.

Although subsequent pressure treatment may enhance the stability of the sulfur trioxide product, the treatment is unnecessary to obtain effectively stabilized sulfur trioxide. Such pressure treatment, when used, may be conducted at temperature of 60° to 100°C. for a period of about 2 to 10 hours.

The stabilizer may be added in any known manner. For example, it may be added directly to the liquid sulfur trioxide and dissolved by agitation. Alternatively, vaporous sulfur trioxide may be condensed in a closed vessel into which the stabilizer has been previously placed.

Liquid $SO_3$ stabilized by the process of this invention remains perfectly liquid at room temperature, even after storage for long periods. If it is frozen, it forms a solid which, when thawed at room temperature, liquefies again. Moreover, when the stabilized $SO_3$ is vaporized, it leaves a flowable liquid residue which may be readily drained from the vaporizer.

The following Examples illustrate practice of our invention and set forth the best mode presently contemplated for its practice, parts being by weight.

EXAMPLES 1–6

In the tests set forth in Table 1 below, liquid sulfur trioxide was mixed with a trimethyl end-blocked dimethyl siloxane polymer of 100 centistokes viscosity (SILICONE) and trimethyl borate, $(CH_3)_3BO_3$ (MB) or trimethoxy boroxine, $(CH_3BO_2)_3$ (TMB), and the samples were placed into ampoules and sealed to exclude extraneous moisture contamination. The samples were frozen at 5°C. and thawed at room temperature for three cycles. In each Example, a portion of the sample was evaporated to determine the consistency of the residue.

TABLE 1

| Wt. % MB | Wt. % TMB | Wt. % Silicone | Wt. % $H_2SO_4$ | % Polymerization in Freeze-Thaw Cycles | | | Residue |
|---|---|---|---|---|---|---|---|
| | | | | 1 | 2 | 3 | |
| 0.05 | | 0.10 | 0.05 | 0 | 0 | 0 | Liquid |
| 0.05 | | 0.10 | 0.10 | 0 | (Lost) | | Liquid |
| 0.0625 | | 0.125 | 0.10 | 0 | 0 | 0 | Liquid |
| | 0.12 | 0.12 | 0.10 | 0* | 0* | 0* | Liquid |
| | 0.05 | 0.20 | 0.10 | 0* | 0* | 0* | Liquid |
| | 0.025 | 0.10 | 0.10 | 0* | 0* | 0* | Liquid |

*Bulk melted to clear liquid, but observed a small growth of clear $SO_3$ crystals on ampoule walls.

Examples 1, 2 and 3 illustrate the surprising efficacy of the siloxane polymer/trimethyl borate stabilizer combination, as compared to that of the siloxane polymer/trimethoxy boroxine stabilizer combination, in that the former combination left no traces of SO₃ polymer crystals on the walls of the ampoule, whereas the latter combination, although highly effective, left small amount of growth of clear SO₃ crystals on the ampoule walls. hence, trimethyl borate is a preferred stabilizer component for purposes of the present invention.

COMPARATIVE TESTS 1–4

The procedure of Examples 1–6 was repeated, using trimethyl borate (MB) and trimethyoxy boroxine (TMB) as sole stabilizers. Results are summarized in Table 2, below.

TABLE 2

| Test No. | Wt. % MB | Wt. % TMB | Wt. % H₂SO₄ | % Polymerization in Freeze-Thaw Cycles | | | Residue |
|---|---|---|---|---|---|---|---|
| | | | | 1 | 2 | 3 | |
| 1 | | 0.054 | 0.10 | 0.3 | 3 | 5 | Solid |
| 2 | | 0.10 | 0.10 | 0 | Tr. | Tr. | Solid |
| 3 | 0.15 | | 0.15 | 0 | 0 | 0 | Solid |
| 4 | 0.15 | | 0.10 | 0 | 0 | 0 | Solid |

The results in Table 2 show that, while each of the stabilizers employed effectively stabilizes sulfur trioxide against polymerization, each leaves a highly undesirable solid residue.

COMPARATIVE TESTS 5–10

The procedure of Examples 1–6 was repeated, using the polysiloxane stabilizer employed in Examples 1–6 as the sole stabilizer. Results are summarized in Table 3 below.

TABLE 3

| Wt. % SILICONE added | Wt% H₂SO₄ | % Polymerization in Freeze-Thaw Cycles | | | Residue |
|---|---|---|---|---|---|
| | | 1 | 2 | 3 | |
| 0.051 | 0.045 | 100 | — | — | Liquid |
| 0.050 | 0.043 | 100 | — | — | Liquid |
| 0.15 | 0.05 | 0 | 0 | 0 | Liquid |
| 0.15 | 0.10 | Tr. | 70 | — | Liquid |
| 0.50 | 0.10 | 0 | 0 | 0 | Liquid |

The data in Table 3 show that polysiloxanes as stabilizers for sulfur trioxide are very sensitive to presence of even minor amounts of H₂SO₄.

When other stabilizer combinations of polysiloxanes and methyl esters of an acid of boron within the purview of the present invention are substituted for those used in the present Examples, in amounts contemplated by the present invention, similar results are obtained, that is to say, sulfur trioxide is effectively stabilized against polymerization, and a desirable liquid residue is obtained on evaporation of the sulfur trioxide.

Since various changes and modifications may be made in carrying out our invention without departing from the spirit and essential characteristics thereof, it is intended that all matter contained in the above description shall be interpreted as illustrative only, the invention being limited solely by the scope of the appended claims.

I claim:

1. A composition consisting of liquid sulfur trioxide and a stabilizer combination comprising (1) a normally liquid siloxane polymer substituted by a radical selected from the group consisting of methyl and methoxy in which all silicon valences unfilled by said radical are satisfied by hydrogen, in amount of at least about 0.01 percent by weight of the sulfur trioxide, and (2) a methyl ester of an acid of boron, in amount of at least about 0.01 percent by weight, the weight ratio of siloxane polymer to the methyl ester being from about 1:1 to about 10:1, said composition leaving a flowable liquid residue on vaporization of the sulfur trioxide.

2. A composition as set forth in claim 1 in which the liquid sulfur trioxide contains at least about 0.01% and up to about 1.0% H₂SO₄.

3. A composition as set forth in claim 1 wherein the siloxane polymer has the formula

in which R', R'' and R'' are selected from the group consisting of methyl, methoxy and hydrogen and n is an integer from 1 to about 900.

4. A composition as set forth in claim 1 wherein the siloxane polymer is a trimethyl end-blocked dimethyl siloxane polymer.

5. A composition as set forth in claim 1 wherein the methyl ester of an acid of boron is selected from the group consisting of trimethyl borate and trimethoxy boroxine.

6. A composition as set forth in claim 5 wherein the methyl ester of an acid of boron is trimethyl borate.

7. A composition as set forth in claim 5 wherein the methyl ester of an acid of boron is trimethoxy boroxine.

8. The method of stabilizing liquid sulfur trioxide which comprises incorporating in said sulfur trioxide a stabilizer combination comprising (1) a normally liquid siloxane polymer substituted by a radical selected from the group consisting of methyl and methoxy in which all silicon valences unfilled by said radical are satisfied by hydrogen, in amount of at least about 0.01 percent by weight of the sulfur trioxide, and (2) a methyl ester of an acid of boron, in amount of at least about 0.01 percent by weight, the weight ratio of siloxane polymer to the methyl ester being from about 1:1 to about 10:1, to obtain a stabilized sulfur trioxide composition leaving a flowable liquid residue on vaporization of the sulfur trioxide.

9. The methd of claim 8 wherein the liquid sulfur trioxide contains at least about 0.01% and up to about 1.0% H₂SO₄.

10. The method of claim 8 wherein the siloxane polymer has the formula

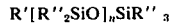

in which R', R'' and R'' are selected from the group consisting of methyl, methoxy and hydrogen and n is an integer from 1 to about 900.

11. The method of claim 10 wherein the methyl ester of an acid of boron is trimethyl borate.

12. The method of claim 10 wherein the methyl ester of an acid of boron is trimethoxy boroxine.

* * * * *